United States Patent
Jung

(10) Patent No.: US 7,036,210 B2
(45) Date of Patent: May 2, 2006

(54) VEHICLE DOOR HINGE MOUNTING SYSTEM

(75) Inventor: Jae Hwan Jung, Asan (KR)

(73) Assignee: Hyundai Motor Company, Seoul (KR)

( * ) Notice: Subject to any disclaimer, the term of this patent is extended or adjusted under 35 U.S.C. 154(b) by 346 days.

(21) Appl. No.: 10/750,691

(22) Filed: Dec. 31, 2003

(65) Prior Publication Data
US 2005/0055824 A1 Mar. 17, 2005

(30) Foreign Application Priority Data
Sep. 15, 2003 (KR) ............... 10-2003-0063585

(51) Int. Cl.
*B23Q 15/00* (2006.01)
(52) U.S. Cl. .............. 29/714; 29/407.04; 29/407.1; 29/464; 29/281.1
(58) Field of Classification Search ............ 29/407.04, 29/407.09, 407.1, 468, 714, 281.1, 281.4, 29/464
See application file for complete search history.

(56) References Cited

U.S. PATENT DOCUMENTS 6,122,813 A * 9/2000 Roy et al. ............. 29/407.09
6,311,382 B1 * 11/2001 Jack ..................... 29/464
6,910,254 B1 * 6/2005 Aoki et al. ............ 29/464

FOREIGN PATENT DOCUMENTS

JP 2002-068037 8/2002

* cited by examiner

*Primary Examiner*—David P. Bryant
(74) *Attorney, Agent, or Firm*—Morgan Lewis & Bockius LLP

(57) ABSTRACT

A door hinge mounting system includes a first multi-sided rotating member and a second multi-sided rotating member that are provided with at least two mounting surfaces. Each of the mounting surfaces of the first and second multi-sided rotating member is provided with a door hinge mounting unit.

9 Claims, 2 Drawing Sheets

VEHICLE DOOR HINGE MOUNTING SYSTEM

CROSS REFERENCE TO RELATED APPLICATIONS

This application claims priority of Korean Application No. 10-2003-0063585, filed Sep. 15, 2003, the disclosure of which is incorporated fully herein by reference.

FIELD OF THE INVENTION

The present invention generally relates to a vehicle door hinge. More particularly the invention relates to a vehicle door hinge mounting system that can be used in an assembly line.

BACKGROUND OF THE INVENTION

Currently, in order to mount a front or rear door hinge to a vehicle body, in a vehicle assembly line, the door hinges are mounted with a manual mounting jig. Such a manual mounting jig is suitable for a low speed assembly line or a two-model assembly line, however, it becomes difficult to apply the manual mounting jig to a high speed assembly line. Furthermore, in order to use the manual mounting jig for a multi-model assembly line the structure of the manual mounting jig becomes very complicated. Therefore, it is also difficult to use the manual mounting jig for a multi-model assembly line.

The information disclosed in this Background of the Invention section is only for enhancement or understanding of the background of the invention and should not be taken as an acknowledgement or any form of suggestion that this information forms the prior art as already known to a person skilled in the art.

SUMMARY OF THE INVENTION

An embodiment of the present invention provides a door hinge mounting system that can be used for a multi-model assembly line and a high speed assembly line.

In a preferred embodiment of the present invention, the door hinge mounting system comprises a first support member, a second support member, a first plate, a second plate, a connecting frame, a first actuator, a first multi-sided rotating member, a second multi-sided rotating member, a second actuator, a synchronization bar, and a control unit.

The first plate is slidably disposed on the first support member. The second plate is slidably disposed on the second support member. The connecting frame connects the first and second plates together. The first actuator moves the connecting frame. The first multi-sided rotating member is rotatably coupled to the first plate and includes at least two first mounting surfaces. Each of the first mounting surfaces is provided with a first door hinge mounting unit. The second multi-sided rotating member is rotatably coupled to the second plate and includes at least two second mounting surfaces. Each of the second mounting surfaces is provided with a second door hinge mounting unit. The second actuator rotates one of the first multi-sided rotating member and the second multi-sided rotating member. The synchronization bar connects the first and second multi-sided rotating members such that they rotate simultaneously. The control unit controls operations of the first actuator, the first multi-sided rotating member, the second multi-sided rotating member, and the second actuator.

It is preferable that each of the first door hinge mounting unit and the second door hinge mounting unit comprises a reference hole detection sensor, a reference pin device, a door hinge mounting device, and at least one fixing device. The reference hole detection sensor detects a position of a reference hole that is formed in a vehicle body. The reference pin device is configured to be coupled to the reference hole. The door hinge mounting device is configured to move in forward, rearward, left, and right directions while the door hinge mounting device fixes a door hinge. The fixing device is provided for fixation to the vehicle body.

It is further preferable that the reference pin device comprises a reference pin, a first driving cylinder, and a second driving cylinder. The reference pin can be inserted into the reference hole. The first driving cylinder moves the reference pin in forward and rearward directions. The second driving cylinder moves the reference pin in left and right directions.

Preferably, the first and second driving cylinders are controlled by the control unit. It is still further preferable that the door hinge mounting device comprises a magnet for fixing the door hinge. It is also preferable that the door hinge mounting device further comprises a fixing pin that can be inserted into a through hole formed in the door hinge.

It is also preferable that the door hinge mounting device further comprises a driving cylinder for moving the magnet and the fixing pin. Preferably, the driving cylinder is controlled by the control unit. Furthermore, the door hinge mounting system further comprises a stopper unit for restricting movement of the connecting frame.

BRIEF DESCRIPTION OF THE DRAWINGS

The accompanying drawings, which are incorporated in and constitute a part of the specification, illustrate an embodiment of the invention, and, read together with the description, serve to explain the principles of the invention, where.

DETAILED DESCRIPTION OF PREFERRED EMBODIMENTS

Figure 1:
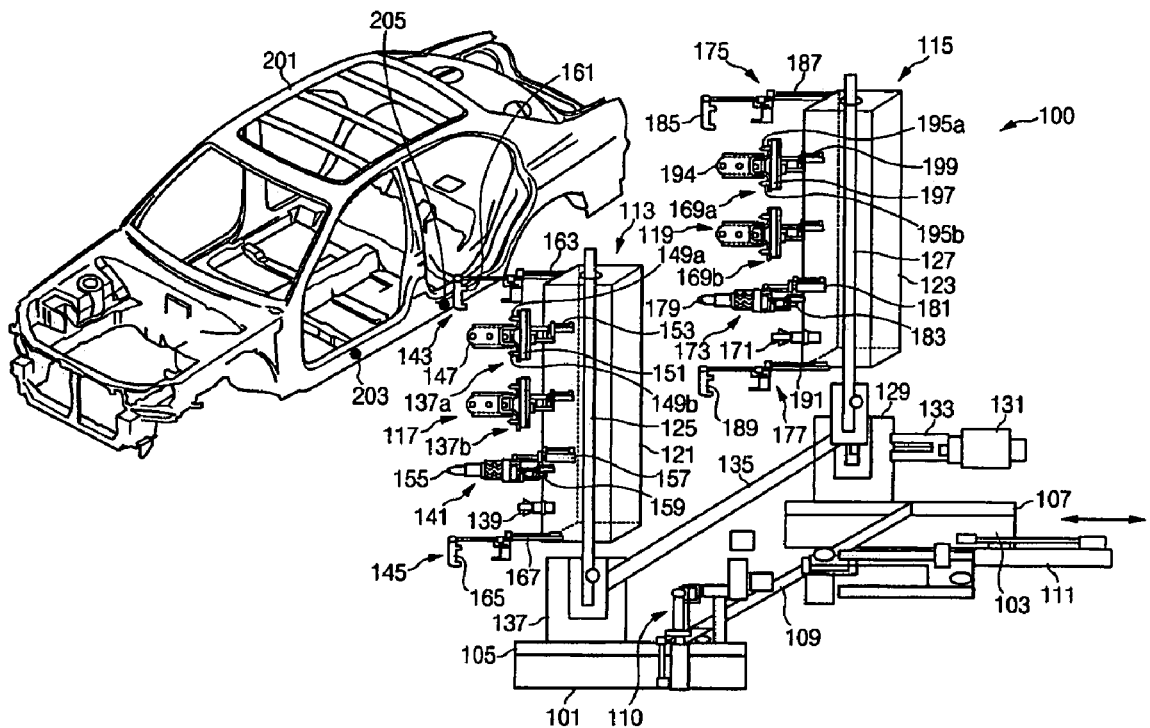
FIG. 1 is a schematic of a door hinge mounting system according to an embodiment of the present invention.

As shown in FIG. 1, a door hinge mounting system 100 includes a first support member 101 and a second support member 103 that are disposed parallel with each other. A first plate 105 is slidably disposed on the first support member 101 and a second plate 107 is slidably disposed on the second support member 103. A connecting frame 109 connects the first plate 105 and the second plate 107 together. The connecting frame 109 is connected to a driving cylinder 111 such that the connecting frame 109 can be moved forward and backward by an operation of the driving cylinder 111. The driving cylinder 111 can be, for example, a pneumatic cylinder. The connecting frame 109 moves forward or backward in response to the operation of the driving cylinder 111 and, consequently, the first and second plates 105 and 107 also move forward and/or backward.

The door hinge mounting system 100 also includes a stopper unit 110 that is configured to restrict a movement of the connecting frame 109. The stopper unit 110 is preferably mounted on the first support member 101 and is disposed at a position corresponding to a maximum position of the connecting frame 109. In use, the stopper unit 110 prevents the connecting frame 109 from moving beyond the maximum position.

Also included on the door hinge mounting system 100 is a first multi-sided rotating member 113 and a second multi-sided rotating member 115. The first multi-sided rotating member 113 is provided with a first door hinge mounting unit 117 for mounting a front door hinge. The second multi-sided rotating member 115 is provided with a second door hinge mounting unit 119 for mounting a rear door hinge. In this embodiment, the first multi-sided rotating member 113 includes a first rotating body 121 having four mounting surfaces and a first rotating shaft 125 that is fixedly inserted into the first rotating body 121. The second multi-sided rotating member 113 includes a second rotating body 123 having four mounting surfaces and a second rotating shaft 127 that is fixedly inserted into the second rotating body 123. That is, as shown in FIG. 1, each of the first and second rotating bodies 121 and 123 has a hexahedral shape and four side surfaces configured as the mounting surfaces. The first door hinge mounting unit 117 is coupled to each of the mounting surfaces of the first multi-sided rotating member 113.

Depicted in FIG. 1 is one first door hinge mounting unit 117 coupled to one of the four mounting surfaces, the other three surfaces are not depicted. However, a similar fist door hinge mounting unit is coupled to each of the other three mounting surfaces. Each of the four fist door hinge mounting units 117 are used for a specific vehicle assembly line.

Preferably, a door hinge mounting unit for a different vehicle model is coupled to each of the mounting surfaces of the first multi-sided rotating member 113. If the first multi-sided rotating member 113 is rotated according to a specific vehicle model, a suitable door hinge mounting unit can be selected. Similarly, the second door hinge mounting unit 119 is coupled to each of the mounting surfaces of the second multi-sided rotating member 115. The second door hinge mounting unit 119 is a device for mounting rear door hinges of different vehicle models.

A lower portion of the second rotating shaft 127 of the second multi-sided rotating member 115 is rotatably inserted into a second housing 129 that is fixedly mounted on the second plate 107. A servo motor 131 is fixed to the housing 129 and is connected to the second rotating shaft 127 such that the second rotating shaft 127 can rotate together with operation of the servo motor 131. As an example, a gear 127a that is formed at a lower end of the second rotating shaft 127 is meshed with a gear 133a that is formed at an end of a rotating shaft 133 of the servo motor 131. Accordingly, the second rotating shaft 127 can rotate with the rotation of the rotating shaft 133 of the servo motor 131. Consequently, the second multi-sided rotating member 115 can rotate in response to operation of the servo motor 131.

A lower portion of the first rotating shaft 125 of the first multi-sided rotating member 113 is rotatably inserted into a first housing 137 that is fixedly mounted on the first plate 105. The first rotating shaft 125 of the first multi-sided rotating member 113 is connected to the second rotating shaft 127 of the second multi-sided rotating member 115 through a synchronization bar 135. Therefore, the first multi-sided rotating member 113 can rotate together with the rotation of the second multi-sided rotating member 115.

Figure 2:
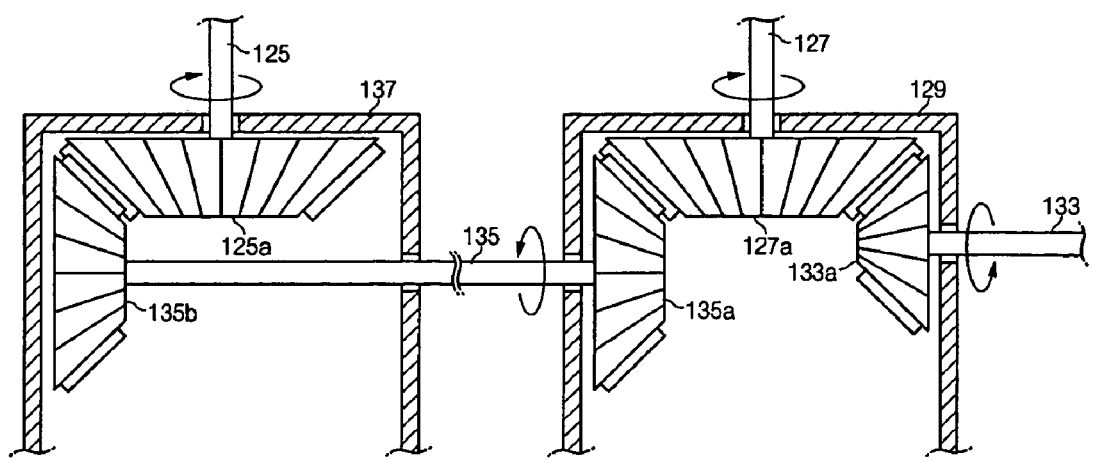
FIG. 2 shows a connection between a first multi-sided rotating member and a second multi-sided rotating member of the door hinge mounting system of FIG. 1.

As shown in FIG. 2, each end of the synchronization bar 135 is provided with gears 135a and 135b. Gear 135a is meshed with the gear 127a of the second rotating shaft 127 of the second multi-sided rotating member 115 and gear 135b is meshed with the gear 125a of the first rotating shaft 125 of the first multi-sided rotating member 113. Therefore, if the second multi-sided rotating member 115 rotates by the operation of the servo motor 131, the first multi-sided rotating member 113 also rotates due to the synchronization bar 135.

As stated in the above, the first door hinge mounting unit 117 is coupled to each of the mounting surfaces of the first multi-sided rotating member 113, and the second door hinge mounting unit 119 is coupled to each of the mounting surfaces of the second multi-sided rotating member 115.

The first door hinge mounting unit 117 includes front door hinge mounting devices 137a and 137b, a front reference hole detection sensor 139, a reference pin device 141, an upper fixing device 143, and a lower fixing device 145. A number of the front door hinge mounting devices can be varied according to a number of front hinges of corresponding vehicle models. Each of the front door hinge mounting devices 137a and 137b include front door hinge fixing pins 149a and 149b that are inserted into and through holes formed on a front door hinge 147. A magnet 151 for holding the front door hinge 147 and a driving cylinder (e.g., a pneumatic cylinder) 153 for moving the front door hinge fixing pins 149a and 149b and the magnet 151 are also included.

The front reference hole detection sensor 139 detects a position of a front reference hole 203 formed on a vehicle body 201. The reference pin device 141 includes a reference pin 155 that can be inserted into the front reference hole 203, a driving cylinder (e.g., a pneumatic cylinder) 157 for moving the reference pin 155 forward or backward, and a driving cylinder (e.g., a pneumatic cylinder) 159 for moving the reference pin 155 left or right.

The upper fixing device 143 includes a hook portion 161 for fixing the first multi-sided rotating member 113 to the vehicle body 201 and a driving cylinder (e.g., a pneumatic cylinder) 163 for driving the hook portion 161. The lower fixing device 145 includes a hook portion 165 for fixing the first multi-sided rotating member 113 to the vehicle body 201 and a driving cylinder (e.g., a pneumatic cylinder) 167 for driving the hook portion 165.

The second door hinge mounting unit 119, that is coupled to each mounting surface of the second multi-sided rotating member 115, includes rear door hinge mounting devices 169a and 169b, a rear reference hole detection sensor 171, a reference pin device 173, an upper fixing device 175, and a lower fixing device 177. The rear reference hole detection sensor 171 detects a rear reference hole 205 that is formed in the vehicle body 201. The reference pin device 173 includes a reference pin 179 that can be inserted into the rear reference hole 205, a driving cylinder (e.g., a pneumatic cylinder) 181 for moving the reference pin 179 forward and backward and a driving cylinder (e.g., a pneumatic cylinder) 183 for moving the reference pin 179 left and right.

The upper fixing device 175 includes a hook portion 185 for fixing the second multi-sided rotating member 115 to the vehicle body 201 and a driving cylinder (e.g., a pneumatic cylinder) 187 for driving the hook portion 185. The lower fixing device 177 includes a hook portion 189 for fixing the second multi-sided rotating member 115 to the vehicle body 201, and a driving cylinder (e.g., a pneumatic cylinder) 191 for driving the hook portion 189.

Each of the rear door hinge mounting devices 169a and 169b includes front door hinge fixing pins 195a and 195b that are inserted into through holes formed on a rear door hinge 194, a magnet 197 for holding the rear door hinge 194, and a driving cylinder (e.g., a pneumatic cylinder) 199 for moving the rear door hinge fixing pins 195a and 195b and the magnet 197.

Figure 3:
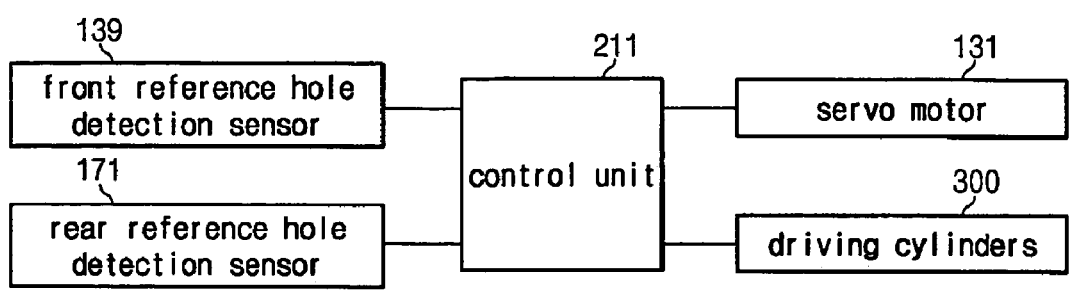
FIG. 3 is a schematic diagram of a control system of the door hinge mounting system of FIG. 1.

As shown in FIG. 3, the door hinge mounting system 100 according to the present invention includes servo motor 131 and a control unit 211 for controlling the driving cylinders 300. The driving cylinders 300 include the above-stated various driving cylinders.

The control unit 211 can be a programmable logic controller (PLC) designed to control the driving cylinder 111, so that the first and second plates 105 and 107 approach the vehicle body 201 to which the front and rear door hinges 147 and 194 are mounted. Then, the control unit 211 controls the servo motor 131 to operate such that the first and second multi-sided rotating members 113 and 115 are arranged such that the door hinge mounting surface, to which the door hinge mounting unit for the current vehicle model is coupled, faces toward the vehicle body 201.

The control unit 211 receives information on positions of the front reference hole 203 and the rear reference hole 205 from the front reference hole detection sensor 139 and the rear reference hole detection sensor 171, respectively. The control unit 211 then controls the reference pin devices 139 and 173 based on the received information such that the front reference pin 155 is inserted into the front reference hole 203 and the rear reference pin 179 is inserted into the rear reference hole 205. Then, the control unit 211 controls the upper fixing devices 143 and 175 and the lower fixing devices 145 and 187, such that the first and second multi-sided rotating members 113 and 115 are fixed to the vehicle body 201.

Next, the control unit 211 controls the front door hinge mounting devices 137a and 137b and the rear door hinge mounting devices 169a and 169b, such that the front and rear door hinges 147 and 194 are positioned to positions suitable for mounting.

Although preferred embodiments of the present invention have been described hereinabove, it should be clearly understood that many variations and/or modifications of the basic inventive concepts herein taught, which may appear to those skilled in the present art, will still fall within the spirit and scope of the present invention, as defined in the appended claims.

What is claimed is:

1. A door hinge mounting system comprising:
   a first support member;
   a second support member;
   a first plate that is slidably disposed on the first support member;
   a second plate that is slidably disposed on the second support member;
   a connecting frame connecting the first and second plates together;
   a first actuator for moving the connecting frame;
   a first multi-sided rotating member that is rotatably coupled to the first plate, the first multi-sided rotating member including at least two first mounting surfaces, each of the first mounting surfaces being provided with a first door hinge mounting unit;
   a second multi-sided rotating member that is rotatably coupled to the second plate, the second multi-sided rotating member including at least two second mounting surfaces, each of the second mounting surfaces being provided with a second door hinge mounting unit;
   a second actuator for rotating one of the first multi-sided rotating member and the second multi-sided rotating member;
   a synchronization bar connecting the first and second multi-sided rotating members such that the first and second multi-sided rotating members rotate simultaneously; and
   a control unit controlling operations of the first actuator, the first multi-sided rotating member, the second multi-sided rotating member, and the second actuator.

2. The door hinge mounting system of claim 1, wherein each of the first door hinge mounting unit and the second door hinge mounting unit comprises:
   a reference hole detection sensor detecting a position of a reference hole that is formed in a vehicle body;
   a reference pin device configured to be coupled to the reference hole;
   a door hinge mounting device configured to move in forward, rearward, left, and right directions, the door hinge mounting device fixing a door hinge; and
   at least one fixing device for fixation to the vehicle body.

3. The door hinge mounting system of claim 2, wherein the reference pin device comprises:
   a reference pin that can be inserted into the reference hole;
   a first driving cylinder for moving the reference pin in forward and rearward directions; and
   a second driving cylinder for moving the reference pin in left and right directions.

4. The door hinge mounting system of claim 3, wherein the first and second driving cylinders are controlled by the control unit.

5. The door hinge mounting system of claim 2, wherein the door hinge mounting device comprises a magnet for fixing the door hinge.

6. The door hinge mounting system of claim 5, wherein the door hinge mounting device further comprises a fixing pin that can be inserted into a through hole formed in the door hinge.

7. The door hinge mounting system of claim 6, wherein the door hinge mounting device further comprises a driving cylinder for moving the magnet and the fixing pin.

8. The door hinge mounting system of claim 7, wherein the driving cylinder is controlled by the control unit.

9. The door hinge mounting system of claim 1, further comprising a stopper unit for restricting movement of the connecting frame.

* * * * *